April 1, 1958   K. LOWITZSCH ET AL   2,829,261
ROTATING FLAT SPECIMEN DEVICE FOR THE GEIGER
COUNTER X-RAY SPECTROMETER
Filed Dec. 31, 1953   3 Sheets-Sheet 2

INVENTORS.
KURT LOWITSCH
BY WILLIAM PARRISH

AGENT.

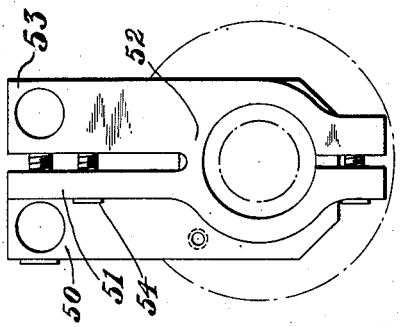
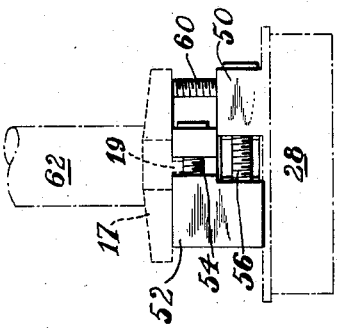
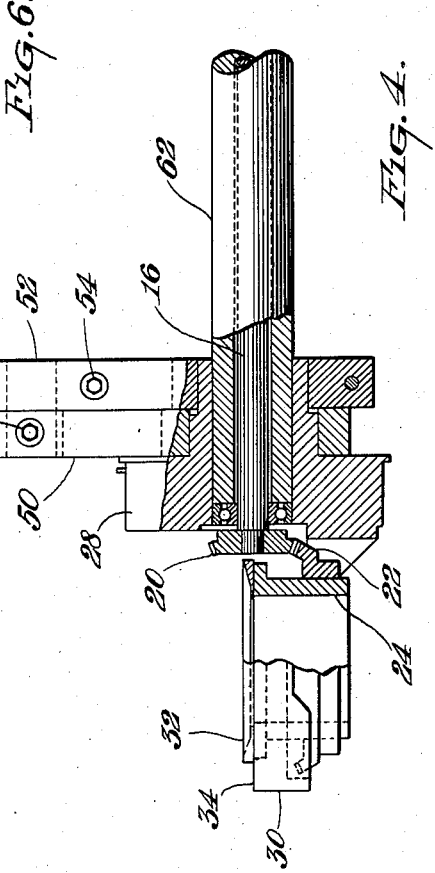
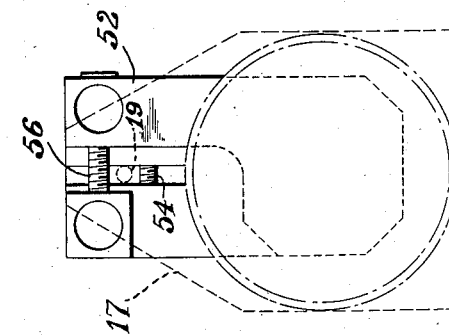
INVENTORS.
KURT LOWITSCH
BY WILLIAM PARRISH
AGENT.

United States Patent Office 2,829,261
Patented Apr. 1, 1958

2,829,261

ROTATING FLAT SPECIMEN DEVICE FOR THE GEIGER COUNTER X-RAY SPECTROMETER

Kurt Lowitzsch, Yonkers, and William Parrish, Hastings, N. Y., assignors, by mesne assignments, to North American Philips Company, Inc., New York, N. Y., a corporation of Delaware Application December 31, 1953, Serial No. 401,520

3 Claims. (Cl. 250—51)

This invention relates to a rotating flat specimen holder for use with a Geiger counter X-ray spectrometer.

It is an object of the present invention to provide a rotating flat specimen holder which when properly aligned results in accurate relative intensity measurements. The present rotating flat specimen holder incorporates built-in grooves or slits which permit the specimen holder and its cooperating elements to be adjusted without the use of additional fixtures.

Heretofore, the stationary sample holder used in a Geiger counter X-ray spectrometer showed extremely large statistical variations of the particles of the powder sample or specimen. These statistical variations may be reduced by using much smaller particle sizes but even when the particles are reduced to less than $10\mu$ the statistical variations of the specimen or sample are still excessive.

It is an object of the present invention to obviate the aforesaid difficulties by providing a flat specimen holder which is designed to rotate at a moderate speed preferably around 77½ R. P. M., around an axis perpendicular ot the irradiated surface. This rotational movement is necessary in order to obtain accurate relative intensity measurements.

A further object of the present invention is to provide a rotating flat specimen device which gives accurate and reproducible results and a considerable gain over the conventional stationary sample holder.

Another object of the present invention is to provide a rotating flat specimen holder which can be incorporated in the X-ray unit without any additional fixtures and when once aligned with respect to the X-ray beam remains aligned. Thus, the present holder may be taken out of the unit and placed back in again after the initial alignment without necessitating an additional alignment thereof.

The above and other features, objects and advantages of the present invention will be fully understood from the following description considered in connection with the accompanying illustrative drawings.

Figure 1:
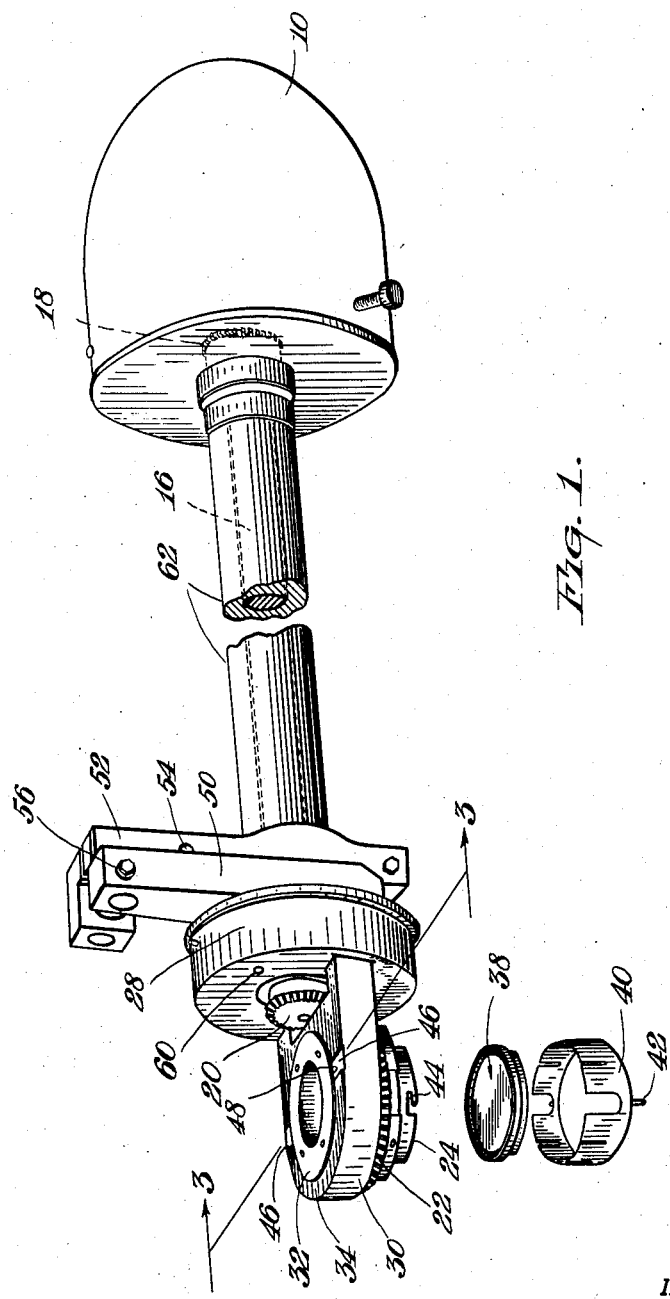
Figure 2:
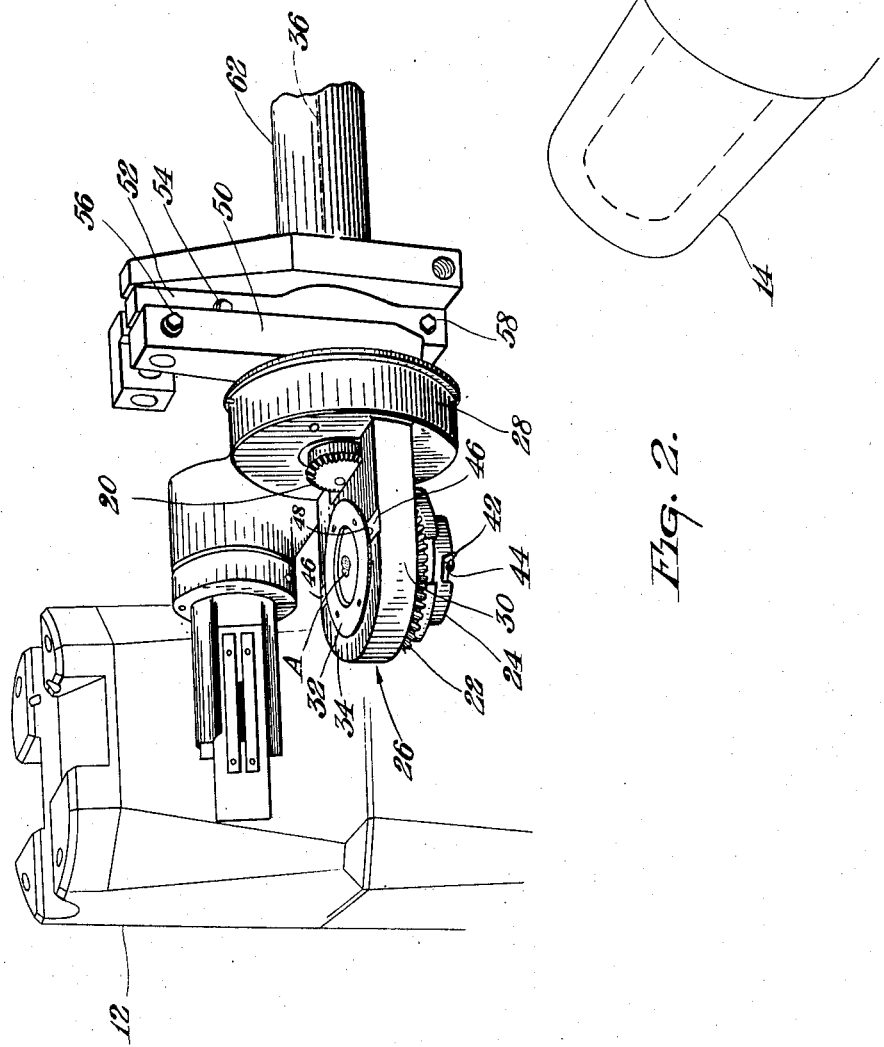

Fig. 1 is a perspective view of the rotating flat specimen device embodying the present invention showing an exploded view of the specimen holder and retainer unit, Fig. 2 is a fragmentary perspective view of the rotating flat specimen device in position with an X-ray source and a Geiger counter tube in operating condition, Fig. 3 is a sectional view taken along the lines 3—3 of Fig. 1, Fig. 4 is a side elevation view of the front end of the rotating flat specimen device partially in section, Fig. 5 is a front elevation view of the alignment fixtures of the device embodying the present invention, Fig. 6 is a top plan view thereof, Fig. 7 is a rear elevation view thereof.

It is to be noted that the X-ray diffraction goniometer utilized with the present invention may be aligned for the zero degree $\theta$ position of the specimen surface which must be precisely one-half the angle of $2\theta$, the angular position of the Geiger tube, where $\theta$ is the Bragg angle for X-ray diffraction in accordance with known procedures and form no part of the present invention.

In order to accomplish the foregoing procedure, the present rotating flat specimen holder device as shown in Figs. 1–4 is inserted through the same aperture that an alignment gauge (not shown) had previously utilized in order to set the Geiger tube position to 0° $2\theta$.

Referring now more particulary to Fig. 1 wherein the rotating flat specimen device embodying the present invention is shown motivated by a driving unit 10. The rotating specimen device itself is mounted so that an X-ray tube enclosed in X-ray source 12 projects a beam which is reflected or radiated from the atomic planes of the elements of the specimen powder sample A to a Geiger counter tube 14 for translation of the information received therefrom (see Fig. 2). It is to be understood that the X-ray source, Geiger counter tube, and driving unit form no part of the present invention, the invention being directed to the method for aligning the rotating flat specimen device on an X-ray diffraction goniometer and a device for accomplishing the same in order to obtain accurate relative intensity measurements.

The rotating flat specimen device is provided with a rotating shaft 16 enclosed in a sleeve 62, said shaft 16 being motivated by driving unit 10. At one end of rotating shaft 16 a gear 18 is located, said gear being adapted to mesh with a spur gear in driving unit 10 (not shown). It should be apparent that the aforesaid spur gear by means of driving unit 10 imparts movement to rotating shaft 16. Gear 20 at the other end of rotating shaft 16 meshes with gear 22 of rotating sleeve or ring 24 to form a bevel gear arrangement. A mounting assembly 26 for rotating sleeve 24 comprises a cylindrical integral element 28 which serves as a support for a cylindrical hood or shield (not shown) which is adapted to fit thereover and to thereby confine X-ray radiation within a narrow path from the X-ray tube to the Geiger counter tube.

Mounting assembly 26 further comprises a horizontal bracket 30 which serves as a mounting for the rotating sleeve 24. Rotating sleeve 24 is further provided with a ground ring 32 which projects above the top surface 34 of the horizontal bracket. The top surface 34 is machined precisely to be co-extensive with the longitudinal axis 36 of the rotating shaft 16. Specimen holder 38 is adapted to fit in retainer 40 thereby forming a combined unit. This combined unit may be inserted in the bore of a rotating sleeve 24 (see Fig. 1). The aforesaid combined unit is preferably held in position by means of bayonet pins 42 which project laterally from retainer 40 and which are adapted to be removably inserted in the bayonet slots 44 in the bottom side walls of rotating sleeve 24. It is to be understood that we do not intend to necessarily limit ourselves to the aforesaid method of securing specimen holder 38 in the bore of rotating sleeve 24 but that other suitable means may be employed to accomplish this purpose.

A groove 46 is preferably cut .001 inch in the top surface 34 at two aligned, opposite places while corresponding grooves 48 are cut .001 inch in the ground ring 32 of rotating sleeve 24.

Surrounding the shaft 16 is an arm 50 integral with cylindrical element 28 and a collar 52 which constitute an alignment fixture for the device. This arm and collar have a plurality of screws 54, 56 and 58 therein which are manipulated together with a screw 60 in cylindrical element 28 in order to translate the rotating flat specimen device in a horizontal plane and also to "rock" the device around its axis of rotation. As seen in Fig. 6 the collar 52 is of the shape illustrated having a U-shaped top portion provided with a relatively thick leg 53 and a relatively thin leg 51. The screw 54 moves the thinner leg 51 toward thicker leg 53 thereby fixing the collar 52 to the locating pin 19 (Figs. 5 and 5a) of the goniometer. Figs. 5 and 5a illustrate the arm 50 which is integral with mounting assembly 26. Since collar 52 is fixed the rotation of screw 56 will cause both arm 50 and the mounting assembly to "rock" about the axis of rotation of the specimen holder 38.

The present device may be aligned by performing the following steps: Rotate ground ring 32 in its own plane until groove 48 coincides with groove 46 of the horizontal bracket 30. The depth positioning of the device should then be checked to make certain that the center of groove 46 is in line with the center of the slits of the X-ray source. This is accomplished by translating the device in the horizontal plane by adjusting screw 60 that bears against goniometer fixture 17 which is fixed to the goniometer (Figs. 2 and 5a). The screw 54 is then tightened thereby causing the thinner leg 51 of collar 52 to move into clamping engagement with locating pin 19 of the goniometer assembly. Thus, the collar 52 is rigidly fixed to the goniometer through locating pin 19. Screw 58 is then loosened and screw 56 is adjusted to cause "rocking" or angular rotation of the mounting assembly 26 since arm 50 is integral with mounting assembly 26 and collar 52 will not move since it is rigidly fixed to the goniometer. The groove 46 is caused to "rock" until the slot is precisely aligned to the 0° X-ray beam. This position of the X-ray beam is located by external instruments which measure the highest intensity of X-ray beam projected through the grooves 46 and 48. When the foregoing is accomplished the mounting surface of the rotating flat specimen is set automatically for the angle θ. Finally, screw 58 is tightened in order to permanently position the rotating flat specimen device in relation to the X-ray source and the Geiger counter tube position. It should be noted that it is within the scope of the present invention to provide only a single groove or slit as an alignment means for the 2:1 setting of the goniometer.

While we have shown and described the preferred embodiment of our invention, it will be understood that the latter may be embodied otherwise than as herein specifically illustrated or described and that in the illustrated embodiment certain changes in the details of construction and in the arrangement of parts may be made without departing from the underlying idea or principle of the invention within the scope of the appended claims.

What we claim is:

1. A rotating flat specimen device for use in X-ray analysis comprising a driving means, a sleeve member secured at one end to said driving means and being provided at its other end with an enlarged suporting element positioned co-axially with said sleeve member, a rotating shaft in said sleeve member operatively connected to said driving means, a horizontal bracket fixed to said supporting element, a rotatable sleeve mounted in said horizontal bracket and operatively connected to said rotating shaft, said rotatable sleeve being provided with a ring having at least one surface thereof projecting above the plane of the top surface of said horizontal bracket, said ring having a pair of aligned, opposed grooves therein for the passage of X-ray beams therethrough, a specimen holder, and means mounting said specimen holder in said rotatable ring.

2. A rotating flat specimen device for use in X-ray analysis comprising a driving means, a sleeve member secured to said driving means at one end thereof and being provided with a supporting element at the other end thereof, a rotating shaft in said sleeve member operatively connected to said driving means, a horizontal bracket fixed to said supporting element, a rotatable ring mounted in said horizontal bracket and operatively connected to said rotating shaft, a specimen holder mounted in said rotatable ring and an arm and collar member adjacent to each other, and means co-acting with said arm and collar member for permitting limited angular rotational movement of said horizontal bracket.

3. A rotating flat specimen device for use in X-ray analysis comprising a driving means, a sleeve member secured at one end to said driving means and being provided at its other end with an enlarged supporting element positioned co-axially with said sleeve member, a rotating shaft in said sleeve member operatively connected to said driving means, a horizontal bracket fixed to said supporting element, a rotatable sleeve mounted in said horizontal bracket and operatively connected to said rotating shaft, said rotatable sleeve being provided with a ring having at least one surface thereof projecting above the plane of the top surface of said horizontal bracket, said ring and the top surface of said horizontal bracket each having a pair of aligned, opposed grooves therein for the passage of X-ray beams therethrough, a specimen holder, and means mounting said specimen holder in said rotatable ring.

References Cited in the file of this patent

UNITED STATES PATENTS

| | | |
|---|---|---|
| 2,490,673 | Champaygne et al. | Dec. 6, 1949 |
| 2,500,926 | Boyd | Mar. 21, 1950 |
| 2,500,948 | Kaiser et al. | Mar. 21, 1950 |
| 2,585,740 | Claassen | Feb. 12, 1952 |
| 2,602,899 | Page | July 8, 1952 |
| 2,626,359 | Weber | Jan. 20, 1953 |